United States Patent [19]

John et al.

[11] 4,429,678

[45] Feb. 7, 1984

[54] CUTTING STYLUS FOR MECHANICALLY CUTTING MASTERS FOR KEEL-LAPPING

[75] Inventors: Gunter John, Indianapolis; James H. Rainey, Danville, both of Ind.; Pierre V. Valembois, Cranbury, N.J.

[73] Assignee: RCA Corporation, New York, N.Y.

[21] Appl. No.: 238,810

[22] Filed: Feb. 27, 1981

[51] Int. Cl.³ .............................................. B28D 5/04
[52] U.S. Cl. ...................... 125/39; 407/119; 369/144
[58] Field of Search ................. 125/39; 76/DIG. 12; 407/118, 119; 408/145; 369/144

[56] References Cited

U.S. PATENT DOCUMENTS

| | | | |
|---|---|---|---|
| Re. 29,113 | 1/1977 | Halter | 358/128 |
| 1,974,215 | 9/1934 | Kilmer | 407/118 |
| 2,860,623 | 11/1958 | Muench | 125/39 |
| 3,025,847 | 3/1962 | Miller | 125/39 |
| 3,842,194 | 10/1974 | Clemens | 178/6.6 A |
| 4,104,832 | 8/1978 | Keizer | 51/281 R |
| 4,162,510 | 7/1979 | Keizer | 358/128 |
| 4,285,324 | 8/1981 | Komanduri | 125/39 |

FOREIGN PATENT DOCUMENTS 78447 12/1918 Sweden .............................. 407/118

*Primary Examiner*—Harold D. Whitehead
*Attorney, Agent, or Firm*—E. M. Whitacre; J. S. Tripoli; J. E. Roehling

[57] ABSTRACT

A cutting stylus adapted for mechanically cutting a deep groove, which may be used in lapping the keel on a playback stylus, is provided. The stylus includes a tapering body, a constricted terminal region and shoulders joining the tapering body and the constricted terminal region. The shape of the constricted terminal region is complementary to the shape of the keel tip on the playback stylus. The terminating portion of the stylus tip has a substantially flat cutting face, a pair of side surfaces extending from the side cutting edges of the cutting face which taper at a slight angle to provide clearance to the side cutting edges, and a bottom surface extending from the bottom cutting edge of the cutting face at an angle which provides relief to the bottom cutting edge.

3 Claims, 12 Drawing Figures

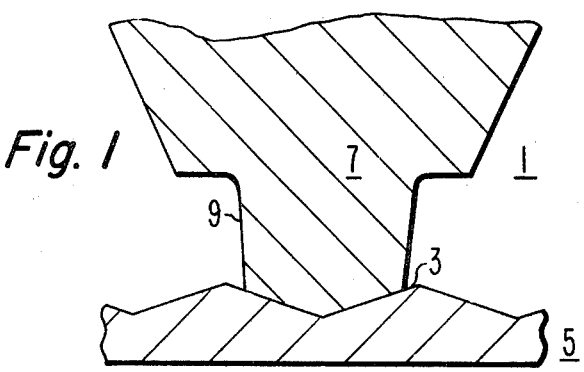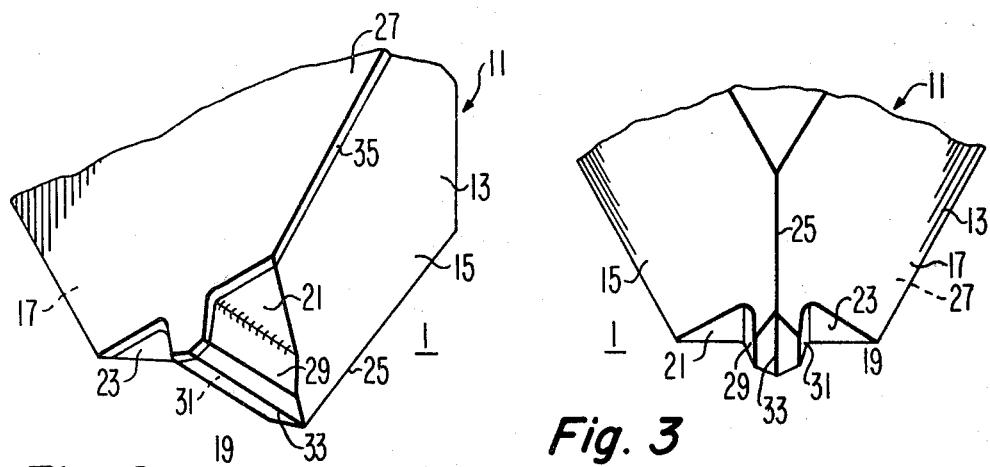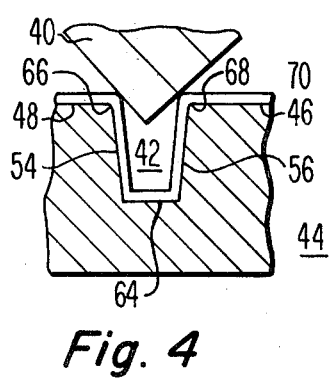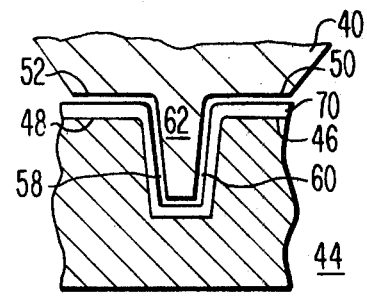

CUTTING STYLUS FOR MECHANICALLY CUTTING MASTERS FOR KEEL-LAPPING

The present invention relates to mechanical mastering techniques for video disc and, more particularly, to a cutting stylus for mechanically cutting a deep groove in a disc which is to be used for lapping a video disc playback stylus.

In U.S. Pat. No. 3,842,194 issued on Oct. 15, 1974 to J. K. Clemens, a video disc playback system of a variable capacitance form is disclosed. In one configuration of a Clemens type video disc, information representative of recorded picture and sound is encoded in a relatively narrow spiral groove on the surface of a disc record. For example, the spiral groove may be 2.5 micrometers wide and 0.5 micrometers deep. During playback, a pickup stylus engages the spiral groove as the disc record is rotated by a turntable. Capacitance variations between a thin conductive electrode on the pickup stylus and a conductive property of the record surface are sensed to recover the information recorded on the disc.

In U.S. Pat. No. 4,162,510 issued on July 24, 1979 to E. O. Keizer, a keel-tipped playback stylus which may be used with a Clemens playback system is disclosed. The keel-tipped playback stylus comprises a dielectric support element having a body, a constricted terminal portion and shoulders interconnecting the body with the constricted terminal portion. The constricted terminal portion is defined by a prow, a substantially flat rear surface remote from said prow, substantially parallel side surfaces extending from the side edges of the rear surface, a bottom surface which preferentially conforms to the shape of the groove bottom extending from the bottom edge of the rear surface and a plurality of additional surfaces extending from the prow and intersecting the bottom and the side surfaces. The separation between the substantially parallel side surfaces is less than the width of the groove (illustratively, less than 2.5 micrometers wide).

A method for forming the keel tip on a Keizer type playback stylus is disclosed in U.S. Pat. No. 4,104,832 issued on Aug. 8, 1978 to E. O. Keizer. In accordance with the Keizer method, a tapered dielectric support element, made from a hard material, such as diamond, is placed in contact with an abrasive lapping disc having a deep, trapezoidally shaped coarsely pitched spiral groove. Relative motion is established between the support element and the lapping disc. The lands on the lapping disc lap the shoulders of the keel-tipped playback stylus and the side walls of the deep groove form the substantially parallel side surfaces of the constricted terminal portion.

In the aforementioned Keizer method patent, it is suggested that the abrasive lapping disc be formed by optical or other high intensity beam techniques. In accordance with these techniques a flat, smooth copper clad substrate is coated with a thick coating of photoresist. The photoresist coated substrate is then exposed with a beam of high energy (e.g., electron or light beam) of a narrow width (e.g., 3.5 micrometers) along a spiral track of a coarse pitch. The exposed photoresist is removed to form a coarse spiral groove on the substrate surface. Metal stampers are obtained from the substrate by plating techniques. The metal stamper may then be used to press plastic lapping discs having a groove of substantially the same shape and size as the groove which was formed in the original photoresist layer. An abrasive material, such as $SiO_2$, may be deposited on the plastic disc to form an abrasive layer suitable for lapping the keel tip on a playback stylus.

For several reasons, the mastering techniques described above may not be completely satisfactory for the manufacture of keel lapping discs. It is very difficult using the aforementioned mastering techniques to control the depth and width of the deep keel lapping groove within the tolerances permitted in the video disc system. The depth of the keel-lapping groove is controlled by the thickness of the photoresist coated on the copper clad substrate. Since the groove depth should be maintained within a tenth of a micrometer, variations of a fraction of a micrometer in the thickness of the photoresist across the surface of a 12 inch diameter (i.e., 30 cm) disc or surface imperfections on the order of a few micrometers (e.g., 3 micrometers) can render a substrate unusable. To control the quality and thickness of the photoresist layer over such a large area is a time consuming and tedious process.

Further, the groove width must be controlled to within a small fraction of a micrometer along the length of the groove spiral. Illustratively, the groove length may be 6 km. The groove width which in the prior art techniques is a function of the surface exposure and the time of development is difficult to control from substrate to substrate. It is extremely difficult to control all of the processing variables so that the groove depth and width do not vary substantially across the surface of a 30 cm diameter disc.

In addition to the problems of controlling the groove width and depth, prior art mastering techniques include processing steps that are time consuming and tedious. For example, after the photoresist has been applied to the metal substrate prior art techniques include a step of uniformly irradiating the photoresist layer with actinic radiation. This processing step of uniform irradiation which is described in detail in U.S. Pat. application Ser. No. 128,871 filed on Mar. 10, 1980 for W. R. Roach et al. reduces the undercutting of the groove. In the absence of the exposure step, some of the developer solvent attacks the unexposed photoresist beneath the surface during photoresist development.

In another prior art mastering step, the nickel master, which is formed by plating over the developed substrate, is coated with a layer of photoresist. The photoresist fills-in between the wall of the groove (i.e., projection on the nickel master which is a negative of the substrate) and the base surface of the nickel master to form a concave junction. Further, processing steps with respect to this filling-in process may include electroplating the nickel master surface with a thin, conformal, conductive metal layer of gold, copper or nickel. This photoresist coating step and subsequent operation (i.e., filleting) provides a smooth transition between the keel shoulder and wall to reduce the incidence of keel-tipped stylus breakage during playback and also to promote release of metal parts during the matrixing process.

According to the Keizer method, a separate processing step must be included during the manufacture of the stylus to provide a keel-tipped playback stylus having a bottom surface which conforms to the shape of the groove bottom of the video disc. This separate step involves a second lapping operation wherein the playback stylus bottom shape is lapped after the keel has been formed. A second lapping operation adds time and cost to the stylus manufacture.

Another problem associated with prior art mastering techniques has been the occurrence of locked grooves on the lapping replica. As a stylus is being lapped, the removal of material essentially ceases when the stylus is kicked back into the same convolution over and over because of the presence of a locked groove. It is not completely clear what the origin of the locked groove defects is but it is generally agreed that the problem is associated with the quality of the record surface—the photoresist may not be uniform, there may be some dust accumulation on the copper surface prior to putting down the photoresist, copper is a very delicate material which is susceptible to micrometer size imperfections which are deleterious to the lapping process. In accordance with the principles of the present invention, locked grooves are substantially eliminated by mechanical cutting of keel-lapping grooves in metal substrates. Further, in accordance with the principles of the present invention, a mechanical mastering technique is provided to form the keel-lapping substrate. It has been discovered that mechanical cutting of keel-lapping grooves provides keel-lapping substrates of improved quality. By mechanically cutting, the depth and width of the keel-lapping groove may be controlled within desired tolerances. This is a difficult task to achieve when cutting a groove having a depth to width ratio of about 2:1 and absolute dimensions which are on the order of the dimensions of a video disc playback stylus.

Additionally, in accordance with the principles of the present invention, the steps of uniform irradiating, filleting and keel-tip bottom lapping may be eliminated from the overall process. Uniform irradiation does not enter into the mechanical mastering technique. Since a mechanically cut, deep keel, groove may be formed having a shoulder-to-keel radius and a conformal bottom, the filleting operation and the separate step of lapping the keel-tip bottom are not necessary.

In accordance with an aspect of the present invention, a cutting stylus for preparing a groove substrate for use in lapping a keel on a playback stylus is provided. The playback stylus is suitable for playing back prerecorded signals from a disc record groove of a given width. A keel which is defined by a constricted terminal region on the tip of the stylus is formed such that it is narrower than the given width. According to the invention, the cutting stylus includes a support body, a protrusion defined by a constricted terminal region having a flat cutting face and shoulders joining the protrusion to the support body. A pair of side surfaces extending from side cutting edges of said flat cutting face are tapered slightly such that clearance is provided to said side cutting edges during the cutting operation. A bottom surface extends from a bottom cutting edge at a slight clearance angle. This angle provides clearance to the bottom cutting edge during the cutting operation.

Other features and advantages of the invention will be more fully understood from the following detailed description of the preferred embodiment, the appended claims and the accompanying drawings in which:

FIG. 1 illustrates a keel-tipped playback stylus riding in a disc record groove;

FIGS. 2 and 3 show perspective views of a keel-tipped stylus;

FIGS. 4 and 5 show a portion of a lapping disc with a playback stylus riding in a lapping groove;

Figure 6:
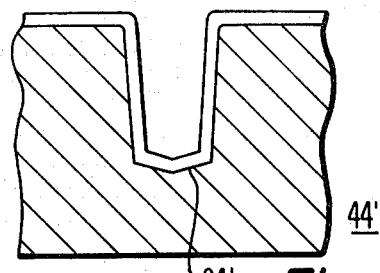
FIG. 6 shows a portion of a lapping disc suitable for forming the keel-tipped stylus of FIGS. 2 and 3.
Figure 8:
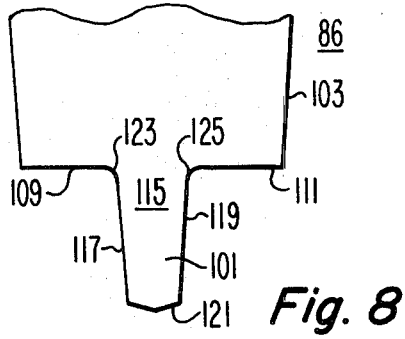
Figure 9:
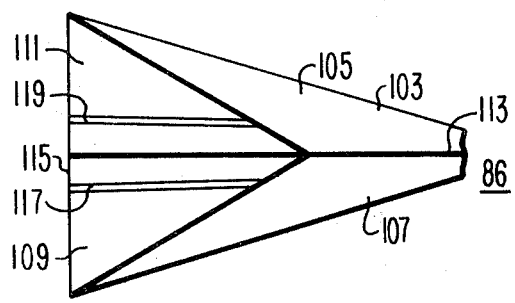
Figure 10:
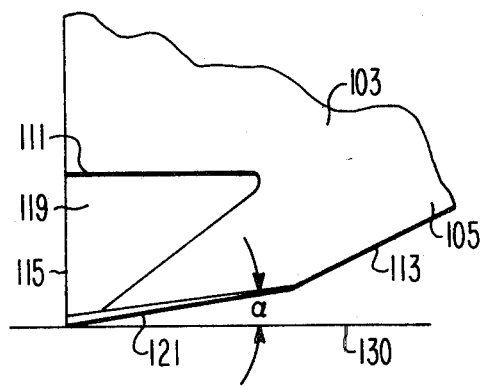
Figure 11:
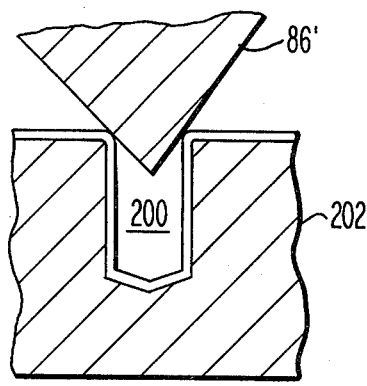
Figure 12:
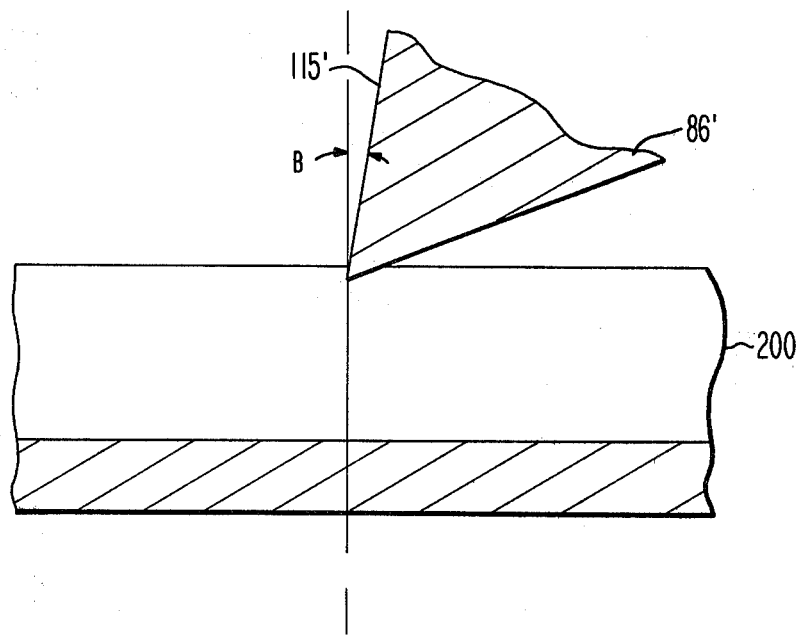

FIGS. 8, 9, and 10 show front, bottom, and side views, respectively, of a cutter tip suitable for mechanically cutting substrates from which lapping discs of FIGS. 6 may be formed; and FIGS. 11 and 12 show a portion of a lapping disc with a cutting stylus riding in a lapping groove.

FIG. 1 shows a pickup or playback stylus 1 riding in a V-shaped groove 3 disposed on the surface of a video disc 5. In video disc systems of variable capacitance type, such as the aforementioned Clemens system, the stylus is moved relative to the groove. Capacitance variations between a conductive electrode on the stylus face 7 and a conductive property of the disc 5 are decoded by suitable signal processing circuitry for display on a television receiver. To obtain adequate playback time, the groove convolutions on the disc 5 are relatively closely spaced (e.g., groove pitch is 2.5 micrometers). In accordance with the aforementioned Keizer patent, pickup stylus 1 has a constricted terminal region 9 (i.e., keel-tip). The keel-tipped stylus 1 has the advantage of reducing or eliminating cross-talk between adjacent grooves in the signal pickup output signal as the stylus wears.

FIGS. 2 and 3 show perspective views of the keel-tipped playback stylus 1. As shown in the respective figures, the keel-tipped stylus 1 includes a dielectric support element 11 formed from a material such as diamond. The dielectric support element 11 comprises a body 13 having bevelled surfaces 15 and 17, a constricted terminal portion 19 and shoulders 21 and 23 joining the bevelled body to the constricted terminal portion.

The constricted terminal portion is defined by a prow 25, a substantially flat rear surface 27 remote from the prow, a pair of substantially parallel side surfaces 29 and 31 extending from the rear surface 27, and a bottom surface 33 extending from the bottom edge of the rear surface. The bottom surface may preferentially conform to the shape of the groove bottom of the playback record. A coating of conductive material 35 is provided on the flat rear surface 27. The conductive coating may be used as one electrode of the aforesaid capacitance system.

The fabrication of the keel-tip of the playback stylus will now be discussed with reference to FIGS. 4 and 5 where sharp-tipped stylus support is made to engage a groove 42 of an abrasive lapping disc 44. The keel tip is formed on the stylus by running the tipped stylus 40 on abrasive lapping disc 44 having a deep coarse-pitched groove 42. The lands 46 and 48 on the lapping disc 44 lap the shoulders 50 and 52 of the stylus 40 and the walls 54 and 56 of the abrasive groove 42 which are slightly tapered form the substantially parallel side surfaces 58 and 60 of keel 62. The abrasive groove 42 may be provided with bottom surface 64 which is flat and the stylus footprint can be lapped later to conform to the shape of the playback disc groove bottom. Alternatively, as will be discussed in greater detail herein, the bottom 64' (as shown in FIG. 6) of abrasive disc 44' may be shaped to form a stylus shoe which conforms to the shape of the groove bottom of a playback disc. Shaping the groove bottom to provide a stylus shoe which will conform to the shape of the groove bottom of a playback disc at the same time that the keel is lapped has not been previously accomplished using prior art techniques.

Referring again to FIGS. 4 and 5, the groove 42 is provided with radii 66 and 68 formed between the groove walls 54 and 56 and the lands 48 and 46 respectively. Radii 66 and 68 provide a smooth transition between groove walls 54 and 56 and lands 48 and 46. The smooth transition at the corners of the playback stylus reduces the incidence of playback stylus breakage during signal recovery and promotes the release of metal parts during the matrixing process. By suitable modification, other shapes may be provided on various surfaces of the keel-lapping groove.

The manufacture of a lapping disc will now be described. In the preferred embodiment, a thin deposit of copper is electroplated on an aluminum substrate disc. The copper deposit is faced off to make the surface to be grooves relatively flat. As will be described in greater detail herein, the flat substrate is positioned on a turntable. A stylus which will be described herein is positioned with respect to the substrate in order to cut a coarse-pitched (illustratively, 6–10 μm) spiral lapping groove when relative motion is effected between the metal substrate and the cutting stylus. A metal stamper is obtained from the spirally groove substrate by a process such as nickel plating. The metal stamper is used to press plastic discs. An abrasive material, such as $SiO_x$ where x has a value of approximately 1–2, is deposited on the surface of the plastic disc to form an abrasive layer 70 as shown in FIGS. 4 and 5.

Figure 7:
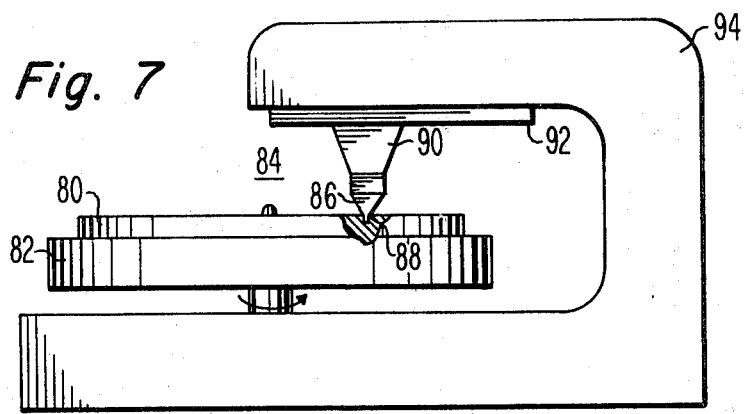
FIG. 7 illustrates, partially in block diagram form, a mechanical cutting apparatus constructed in accordance with the principles of the present invention.

FIG. 7 illustrates an apparatus for mechanically cutting a deep keel-lapping groove in a metal substrate 80. The metal substrate 80 is placed on a movable support 82 (i.e., turntable) in operating relationship with a cutter-head 84 including a cutting stylus 86. The cutting stylus 86 is positioned with respect to the metal substrate 80 in order to cut a groove 88 having a groove depth of illustratively 4 μm while the relative motion is established between the stylus and the metal substrate. A pedestal 90 which supports cutting stylus 86 is secured to a slide 92 which is movably supported on a frame 94. The pedestal 90 is translated on slide 92 along a line passing through the center of rotation of the metal substrate 80 in correlation with the rotational motion of the metal substrate such that a spiral groove 88 is cut on the surface of the metal substrate.

FIGS. 8, 9, and 10 illustrate front, bottom, and side views respectively of a tip of the cutting stylus 86. Cutting stylus 86 formed of a hard material, illustratively diamond, has a protrusion 101 complementary to the shape of the keel-lapping groove to be cut in the metal substrate. The tip comprises a support body 103 having bevelled surfaces 105 and 107, the protrusion 101 which is a constricted terminal region and shoulders 109 and 111 joining the bevelled body to the constricted protrusion. The constricted protrusion 101 is defined by a prow 113, a substantially flat cutting face 115 remote from the prow, a pair of side surfaces 117 and 119 extending from the side cutting edges of the cutting face 115 and a bottom surface 121 extending from the bottom cutting edge of the cutting face. The side cutting edges are formed having a slight taper to provide the tapered side walls discussed supra. The bottom surface 121 may be provided with a shape which conforms to the shape of the groove bottom in a playback disc record, illustratively, bottom surface 121 is shown having a V-shape conformal to the groove bottom in video disc 5 of FIG. 1.

When the cutting stylus 86 is positioned on pedestal 90 for cutting into the metal substrate, the cutting face 115 is arranged to be substantially perpendicular to the surface of the metal substrate and substantially perpendicular to the direction of relative motion established between the cutting stylus and the metal substrate. In this arrangement, the bottom surface 121 of the cutting stylus is formed to provide a slight clearance angle (illustratively, 5°–10°) between the groove bottom 130 and the bottom surface 121. In a similar manner, side surfaces 117 and 119 are formed such that there is a slight relief angle (illustratively, 1°–3°) between the groove walls and the side surfaces 117 and 119 when the stylus is engaged in the metal substrate. Further, cutting stylus 86 is formed with radii 123 and 125 between the intersection of side surfaces 117 and 119 and shoulders 109 and 111. The radii 123 and 125 provide radii 66 and 68 on groove 42 as shown in FIGS. 4 and 5.

During the cutting operation the stylus protrusion 101 which illustratively has dimensions of 4 μm in length and of 2 μm in width enters the metal substrate surface until radii 123 and 125 begin to form complementary radii in the metal substrate. The stylus tip must be engaged such that the tip having an aspect ratio of approximately 2:1 forms the lapping groove in a single pass across the metal substrate surface. It has been found that mechanical cutting of deep keel-lapping grooves has provided excellent results with improved yields in both metal substrates and keel-tipped styli.

The fabrication of cutting stylus 86 will now be described with reference to FIGS. 11 and 12. The stylus may be fabricated by lapping techniques similar to those described above with reference to the playback stylus. A sharp-tipped stylus support 86' is made to engage a groove 200 of an abrasive lapping disc 202. The protrusion on the tip of cutting stylus 86 is formed on the stylus by running the tip of stylus 86' on abrasive lapping disc 202 having a deep coarse-pitched groove 200. By positioning stylus 86' such that the front face, makes an angle, illustratively 10°–15°, with a normal to the lapping disc surface not only will the clearance angle of FIG. 10 be formed between the bottom surface of the cutter and the substrate surface but also side surfaces 117 and 119 of stylus 86 will be formed having a slight relief angle (i.e., 1°–3°).

If cutting stylus 86 is fabricated without the clearance and relief angles suggested herein, difficulties may arise during the mechanical cutting operation. For example, the metal chip formed by cutting the keel in the metal substrate may ball up, break or otherwise hinder the formation of the groove in the metal substrate. Improper angles may affect the quality of the surface of the keel-lapping master, thus affecting the separation of metal parts during the matrixing process. Further, if the cutting operation is not performed correctly, the cutting stylus tip may be broken off, thus damaging the stylus as well as the metal substrate.

What is claimed is:

1. A cutting stylus for cutting a fully shaped groove in a metal substrate as a step in a process for lapping a keel on a playback stylus, said playback stylus being suitable for playing back prerecorded signals from a disc record groove of a given width, said keel being defined by a constricted terminal region on the tip of said playback stylus, said constricted terminal region being narrower than said given groove width, said cutting stylus comprising:

a support body;

a protrusion defined by a constricted terminal region; and shoulders joining said protrusion to said support body;
said protrusion including;
a flat cutting face having a shoulder end and a distal end;
a pair of side surfaces extending from side cutting edges of said flat cutting face, said side cutting edges being tapered to form said protrusion such that said cutting face has a beveled contour having a first thickness proximate to said shoulder end and a second thickness which is less than said first thickness proximate said distal end; and
a bottom surface extending from a bottom cutting edge of said flat cutting face;
wherein said side surfaces taper at an angle of 1 to 3 degrees such that clearance is provided to said side cutting edges during the cutting operation and said bottom surface is formed such that a clearance angle of 5 to 10 degrees is provided to said bottom cutting edge during the cutting operation;
wherein said flat cutting face of said protrusion has dimensions of approximately 4 μm deep by 2 μm wide;
whereby said groove in said metal master is cut, in a single pass across a surface of said metal master, having a contour that is the same as the contour of said cutting face.

2. The cutting stylus according to claim 1 wherein a radius is formed where said shoulders join to said protrusion and wherein said bottom cutting edge is V-shaped such that a V-shaped groove bottom is formed during the cutting operation.

3. The cutting stylus according to claim 2 wherein said cutting stylus is formed of diamond.

* * * * *